United States Patent
Okadome et al.

(10) Patent No.: US 11,551,078 B2
(45) Date of Patent: Jan. 10, 2023

(54) DATA PROCESSING APPARATUS AND DATA PROCESSING METHOD

(71) Applicant: Hitachi, Ltd., Tokyo (JP)

(72) Inventors: Yuya Okadome, Tokyo (JP); Wenpeng Wei, Tokyo (JP); Toshiko Aizono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 982 days.

(21) Appl. No.: 16/291,115

(22) Filed: Mar. 4, 2019

(65) Prior Publication Data
US 2020/0065669 A1 Feb. 27, 2020

(30) Foreign Application Priority Data

Aug. 27, 2018 (JP) .............................. JP2018-158551

(51) Int. Cl.
*G06N 3/08* (2006.01)
*G06Q 30/06* (2012.01)
*G06N 3/04* (2006.01)
*G06Q 30/02* (2012.01)
*G06Q 10/06* (2012.01)

(52) U.S. Cl.
CPC ............. *G06N 3/08* (2013.01); *G06N 3/0454* (2013.01); *G06Q 10/0631* (2013.01); *G06Q 30/0202* (2013.01); *G06Q 30/0631* (2013.01)

(58) Field of Classification Search
CPC .... G06N 3/08; G06N 3/0454; G06Q 10/0631; G06Q 30/0202; G06Q 30/0631
See application file for complete search history.

(56) References Cited

U.S. PATENT DOCUMENTS

| | | | |
|---|---|---|---|
| 6,032,125 A * | 2/2000 | Ando | G06Q 30/02 705/28 |
| 10,936,947 B1 * | 3/2021 | Flunkert | G06N 3/0445 |
| 11,276,072 B2 * | 3/2022 | Feldman | G06Q 30/0202 |
| 2020/0134642 A1 * | 4/2020 | Morgan | G06Q 30/0202 |

FOREIGN PATENT DOCUMENTS

| | | | |
|---|---|---|---|
| JP | 8-212191 A | | 8/1996 |
| JP | 10-143490 A | | 5/1998 |
| JP | 2008-83999 A | | 4/2008 |
| JP | 2008083999 A | * | 4/2008 |

OTHER PUBLICATIONS

Japanese Office Action received in corresponding Japanese Application No. 2018-158551 dated Apr. 8, 2020.
Japanese Office Action received in corresponding Japanese Application No. 2018-158551 dated Nov. 17, 2020.

* cited by examiner

*Primary Examiner* — Dylan C White
(74) *Attorney, Agent, or Firm* — Mattingly & Malur, PC

(57) ABSTRACT

An error in a demand prediction of items is reduced. A data processing apparatus for processing data on a demand for multiple items includes a model learning unit that generates a prediction model for predicting the demand for the multiple items, and a demand prediction unit that predicts the demand for the multiple items by using the prediction model. The model learning unit inputs actual data of the demand for each item to a first neural network of each item, extracts a feature quantity of each item, and combines the feature quantity of each item to generate a second neural network that is a prediction model.

6 Claims, 10 Drawing Sheets

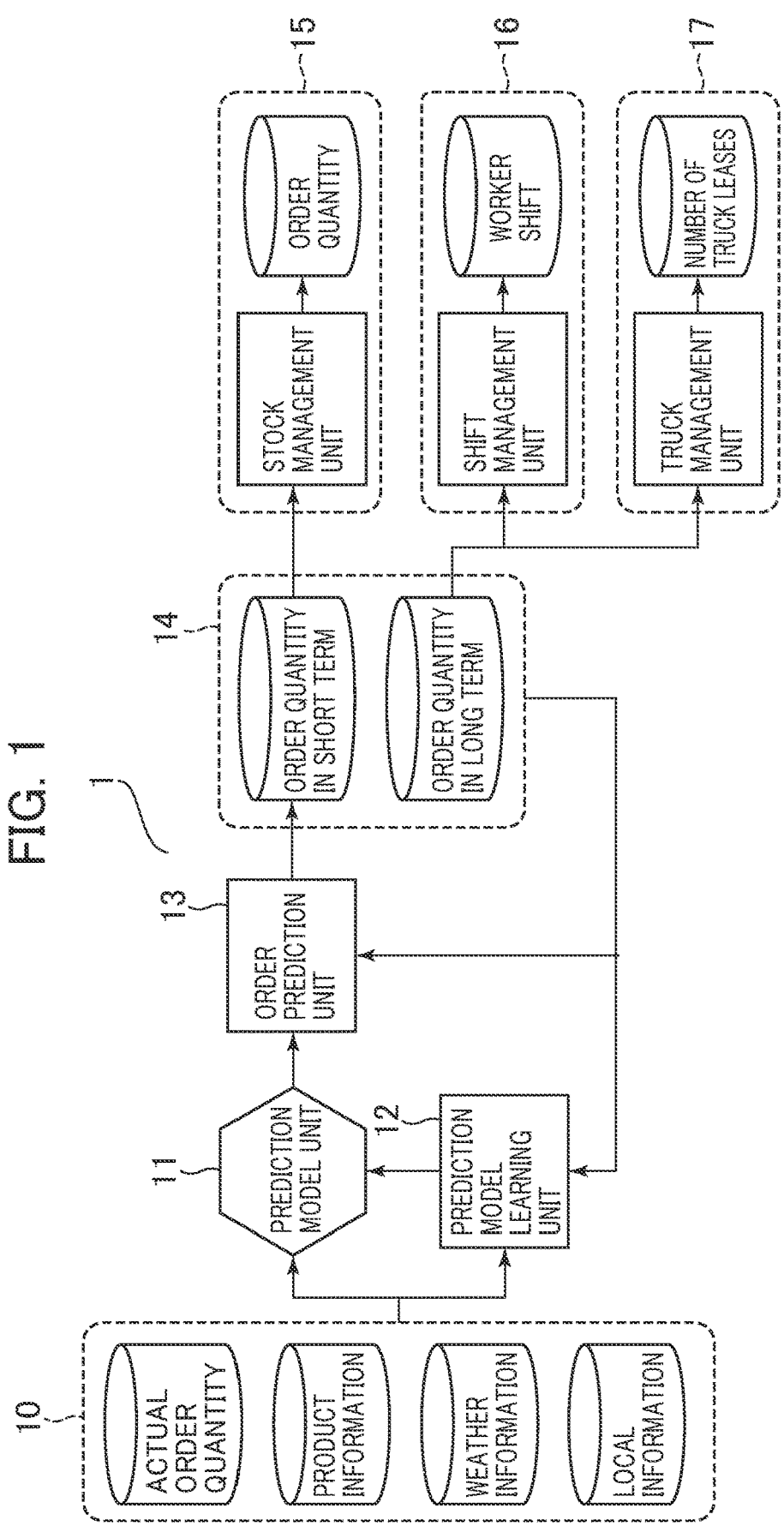

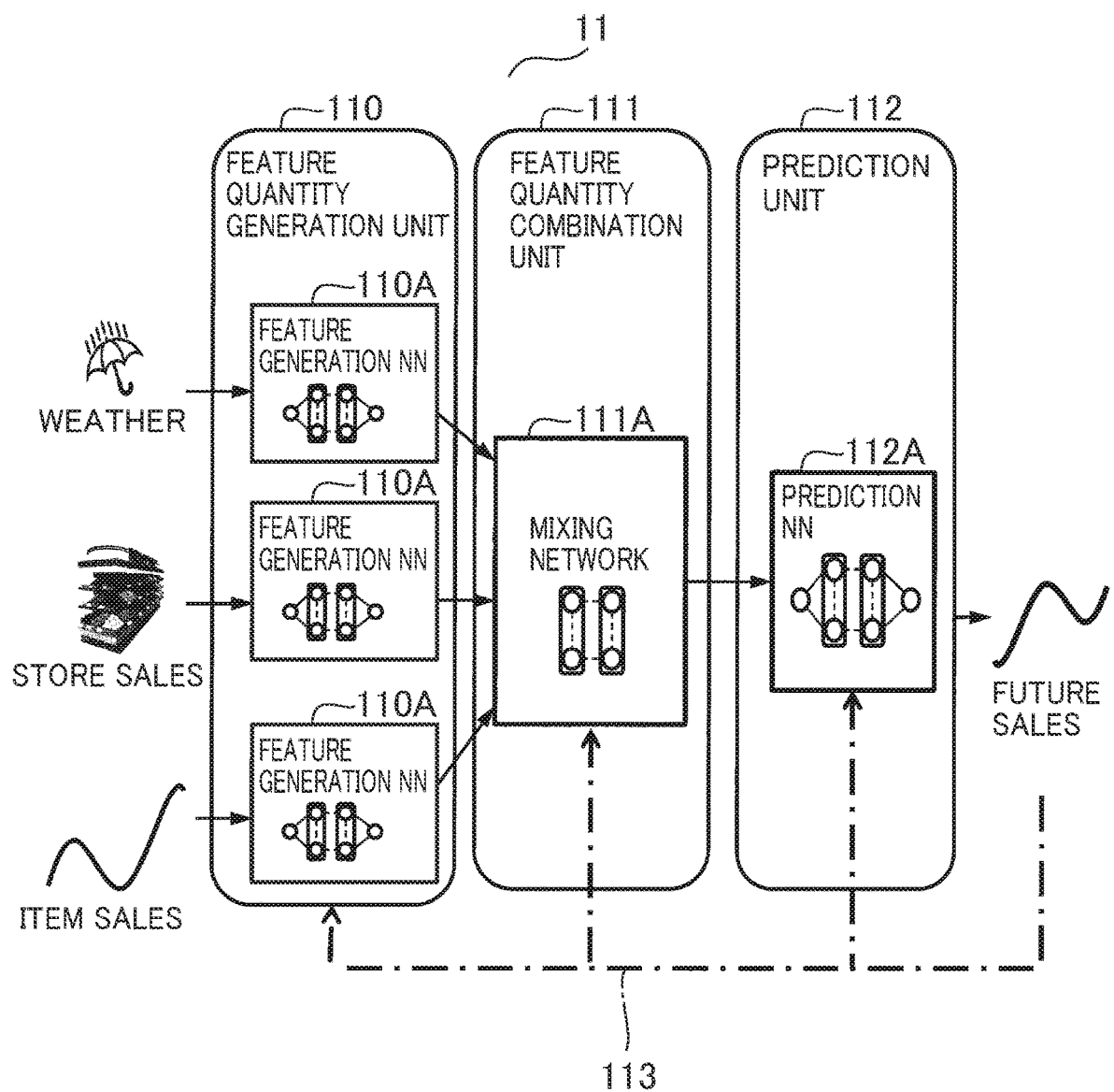

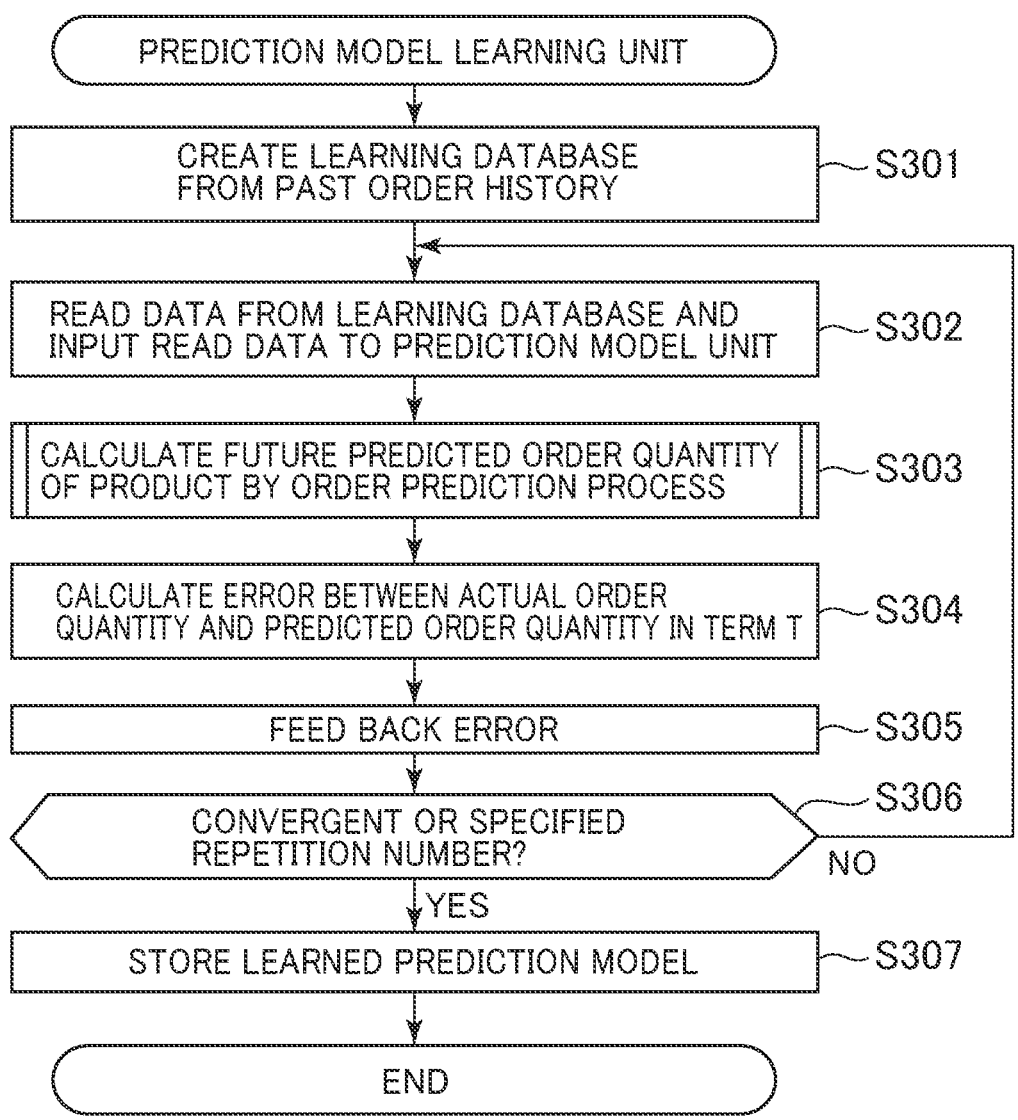

| NUMBER OF DAYS TO CUT OUT | 1 | 2 | 3 | ... | P |
|---|---|---|---|---|---|
| PRODUCT A ORDER | 10 | 41 | 21 | ... | 5 |
| PRODUCT CATEGORY A ORDER | 582 | 986 | 1749 | ... | 821 |
| PRODUCT A: CATEGORY | FROZEN DESSERT | FROZEN DESSERT | FROZEN DESSERT | ... | FROZEN DESSERT |
| PRODUCT A: PRODUCT NAME | XX ICE | XX ICE | XX ICE | ... | XX ICE |
| WEATHER | RAIN | SUNNY | CLOUDY | ... | RAIN |
| ⋮ | ⋮ | ⋮ | ⋮ | ⋮ | ⋮ |

LEARNING DATABASE

102A

| NUMBER OF DAYS TO CUT OUT | 0 | 1 | 2 | ... | T |
|---|---|---|---|---|---|
| PRODUCT A ORDER | 5 | 82 | 23 | ... | 24 |
| PRODUCT A: CATEGORY | FROZEN DESSERT | FROZEN DESSERT | FROZEN DESSERT | ... | FROZEN DESSERT |
| PRODUCT A: PRODUCT NAME | XX ICE | XX ICE | XX ICE | ... | XX ICE |
| ⋮ | ⋮ | ⋮ | ⋮ | ⋮ | ⋮ |

LEARNING DATABASE: ERROR CALCULATION DATA

FIG. 6

| DATE | 2018/1/1 | 2018/1/2 | ... |
|---|---|---|---|
| PRODUCT A | 29 | 42 | ... |
| PRODUCT B | 32 | 128 | ... |
| PRODUCT C | 1063 | 683 | ... |
| ⋮ | ⋮ | ⋮ | ⋮ |

ORDER QUANTITY PREDICTION SCREEN

SHIFT MANAGEMENT SCREEN

TRUCK NUMBER MANAGEMENT SCREEN

DATA PROCESSING APPARATUS AND DATA PROCESSING METHOD

CROSS-REFERENCE TO RELATED APPLICATION

The present application claims priority from Japanese application JP 2018-158551, filed on Aug. 27, 2018, the contents of which is hereby incorporated by reference into this application.

TECHNICAL FIELD

The present disclosure relates to a data processing apparatus.

BACKGROUND ART

Patent Literature 1 discloses "there are provided a prediction model 1 in which multiple models of a neural network are stored in advance, and a prediction model 2 in which sales performances are acquired, the sales performance in a first period is input to the neural networks of the multiple models as processing elements, the respective neutral networks learn to output data as close as possible to the sales performance in a second period after the first period, a model of the neural network from which data output as a demand predicted value in the second period is closest to the sales performance in the second period is selected from the learned neutral networks, and a latest sales performance is input to the neural network of the learned model in question to predict a demand".

CITATION LIST

Patent Literature

Patent Literature 1: Japanese Unexamined Patent Application Publication No. Hei 10-143490

SUMMARY OF INVENTION

Technical Problem

An apparatus disclosed in Patent Literature 1 predicts a demand from sales performances of a target product by neural networks. The neural network captures a feature quantity of the target product by learning and performs a demand prediction which conforms to the feature quantity.

When a demand is predicted by physical distribution or the like, demand predictions of multiple target products are often required. Demand features of the target products are diverse. When the extraction of the feature quantity and the prediction of demand are learned by the same neural network as in the apparatus disclosed in Patent Literature 1, it is difficult to excellently reflect the feature quantities of the multiple target products having various features in the neural network. This makes it difficult to sufficiently reduce an error of the demand prediction caused by how to capture the feature quantity.

An object of the present disclosure is to provide a data processing apparatus capable of reducing an error of demand prediction of products.

Solution to Problem

According to one aspect of the present disclosure, there is provided a data processing apparatus for processing data on demand of a plurality of items, including: a model learning unit that generates prediction models for predicting demands of a plurality of items; and a demand prediction unit that predicts the demands of the plurality of items by using the prediction models, in which the model learning unit inputs actual data of the demand for each of the items to a first neural network of each of the items to extract a feature quantity of each of the items, and combines the feature quantity of each of the items together to generate a second neural network which is the prediction model.

Advantageous Effects of Invention

According to the present disclosure, an error in demand prediction of the product can be reduced.

BRIEF DESCRIPTION OF DRAWINGS

FIG. 1 is a block diagram showing a configuration example of a warehouse management system according to an embodiment.

FIG. 2 is a block diagram illustrating a configuration example of a prediction model unit.

FIG. 3 is a flowchart showing a processing example of a prediction model learning unit.

FIG. 4 is a diagram showing a configuration example of a learning database for use in the processing of the prediction model learning unit.

FIG. 6 is a diagram showing an example of order prediction information.

DESCRIPTION OF EMBODIMENTS

Figure 5:
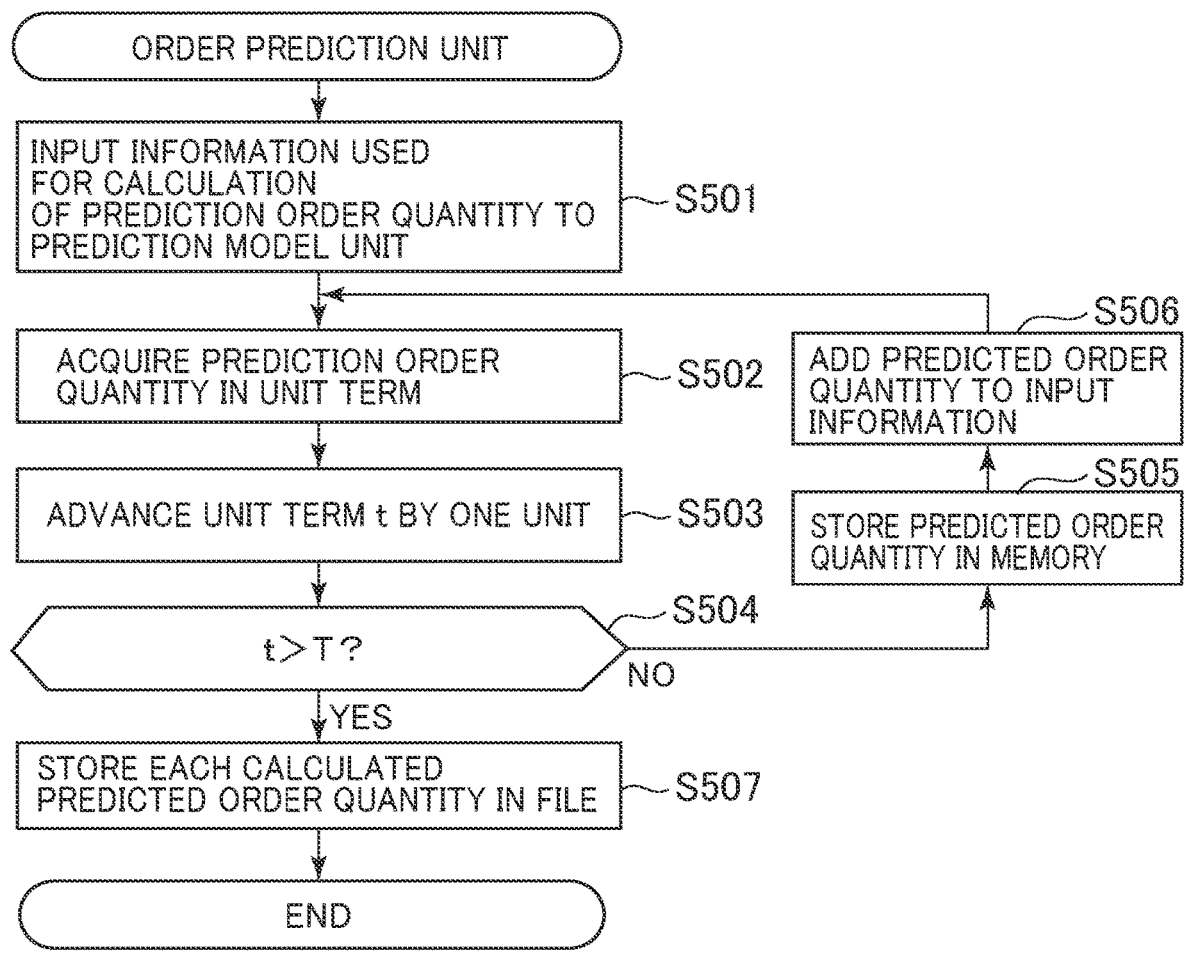
FIG. 5 is a flowchart showing a processing example of an order prediction unit.

One embodiment will be described below.

FIG. 1 is a block diagram showing a configuration example of a warehouse management system 1. A warehouse management system 1 as an example of a data processing apparatus includes a database 10, a prediction model unit 11, a prediction model learning unit 12, an order prediction unit 13, a data storage unit 14, a stock management unit 15, a personnel shift management unit 16, and a truck number management unit 17.

The database 10 holds various kinds of information that can be input to the prediction model unit 11. The various kinds of information hold, for example, actual order information, product information, weather information, and area information. The actual order information includes the past order quantity of the product (that is, the actual order). The product information includes information on the products such as names, genres and prices of the products. The weather information includes information on the weather of the past days (for example, information on sunny, cloudy, and rainy). The local information includes information on an area where the products are sold.

The prediction model unit 11 outputs future information on the orders (hereinafter referred to as "predicted order information") according to the various types of information input. A prediction accuracy of the prediction model unit 11 varies depending on a large number of parameters in the prediction model unit 11.

The prediction model learning unit 12 adjusts (optimizes) a parameter of the prediction model unit 11 based on various types of information stored in the database 10 and the predicted order information output from the prediction model unit 11.

The order prediction unit 13 calculates the predicted order information in a desired predicted period with the use of the prediction model unit 11. For example, the order prediction unit 13 reads information of various types in a desired prediction period from the database 10 and inputs the read information to the prediction model unit 11. The order prediction unit 13 calculates the predicted order quantity of the product or the like in the prediction period based on the predicted order information output from the prediction model unit 11. The order prediction unit 13 stores the calculated predicted order quantity in the data storage unit 14. At this time, the order prediction unit 13 may divide the calculated predicted order quantity into a short-term predicted order quantity and a long-term predicted order quantity according to the prediction period, and store the predicted order quantity in the data storage unit 14. For example, the order prediction unit 13 may store the predicted order quantity for the prediction period from several days as the short-term predicted order quantity, and the predicted order quantity for the prediction period from several weeks to several months as the long-term predicted order quantity.

The stock management unit 15 reads the predicted order quantity from the data storage unit 14, and determines the order quantity or the like of the product.

The personnel shift management unit 16 reads out the predicted order quantity from the data storage unit 14 and determines the personnel shift and the like.

The truck number management unit 17 reads the predicted order quantity from the data storage unit 14 and determines the number of delivery trucks and the like.

FIG. 2 is a block diagram showing a configuration example of the prediction model unit 11. The prediction model unit 11 includes a feature quantity generation unit 110, a feature quantity combination unit 111, and a prediction unit 112.

<Feature Quantity Generation Unit>

The feature quantity generation unit 110 reads time series information of various types from the database 10 together with type information indicating the type, and extracts the feature quantity in the time series information for each type with the input of the type information and the time series information. Time series information is information whose value (or state) can change with the lapse of time. The time-series information is, for example, actual information (history information) such as store sales, number of sales of the products, sales amount, and order quantity. In addition, the time series information is weather information and the like. In this example, the actual information such as the number of sales of products and the weather information are time series information of different types. For example, in the case of the sales amount of a store, the type information associated with the time series information includes information for identifying the store such as a store name.

The feature quantity generation unit 110 extracts the feature quantity in the time series information of the type with the use of the feature quantity generation neural network 110A for each type. That is, the feature quantity generation unit 110 has the feature quantity generation neural networks 110A according to the type of time-series information. In this manner, with the use of the unique neural network 110A for each type, a remarkable feature quantity can be extracted for each type.

<Feature Quantity Combination Unit>

The Feature quantity combination unit 111 combines the feature quantity of each type which has been extracted by the feature quantity generation unit 110 with the feature quantity of a format that can be used for prediction. Hereinafter, the feature quantity combined by the feature quantity combination unit 111 is referred to as "combined feature quantity". The feature quantity combination unit 112 may combine the feature quantity for each type together with the use of a predetermined module 111A. The predetermined module 111A may be a neural network that weights the input feature quantity for each type and outputs the combined feature quantity. Alternatively, the predetermined module 111A may output a result obtained by simply adding or simply averaging the input feature quantity for each type as a combined feature quantity.

<Prediction Unit>

The prediction unit 112 calculates the predicted order quantity with the use of the neural network 112A, and outputs the calculated predicted order quantity. In this example, the prediction unit 112 determines an initial parameter of the neural network 112A with the use of the combined feature quantity output by the feature combination unit 111. The prediction unit 112 calculates the predicted order quantity in a period T with the use of the neural network 112A. The period T may be determined by inputting product information which is an example of prediction information. The product information may include an actual order (order history) of a certain product, a product name, and the like.

The multiple parameters in the prediction model unit 11 may be adjusted (optimized) by the prediction model learning unit 12. For example, the prediction model learning unit 12 calculates the error based on the predicted order quantity and the actual order quantity in the period T from a certain point of time. The prediction model learning unit 12 feeds back 113 the error to the feature quantity generation unit 110, the feature quantity combination unit 111, and the prediction unit 112. As a result, the learning of the neural networks 110A, 111A, and 112A is advanced, and the accuracy of the predicted order quantity is improved.

FIG. 3 is a flowchart illustrating an example of processing of the prediction model learning unit 12.

In Step S301, the prediction model learning unit 12 creates a learning database 10A (refer to FIG. 4) from the database 10. For example, the prediction model learning unit 12 extracts from the database 10, first information in a past period P before a certain time point and second information in a future period T after the certain time point, and stores the first information and the second information in the learning database 10A as a learning record. The first information in the period P is, for example, actual sales information for 90 days in the past before a certain point of time. The second information in the period T is, for example, actual order information for the future period T after the certain point of time. In other words, the prediction model learning unit 12 extracts, from the database 10, the first information on the certain product in the period T and the second information on the certain product in the period P, and registers the first information and the second information in the learning database 10A. Then, the flow proceeds to Step S302.

In Step S302, the prediction model learning unit 12 extracts the product information (first information) to be predicted from the learning database 10A and inputs the extracted product information to the prediction model unit 11. At this time, the multiple product information may be set to prediction targets at once. Then, the flow proceeds to Step S303.

In Step S303, the prediction model learning unit 12 calculates the predicted order quantity of the product in the period T in the same process (refer to FIG. 5) as that of the order prediction unit 13. Then, the flow proceeds to Step S304.

In Step S304, the prediction model learning unit 12 calculates an error between the predicted order quantity in the period T calculated in Step S303 and the actual order quantity in the same period T. Then, the flow proceeds to Step S305. The prediction model learning unit 12 may calculate the error by, for example, a mean square error. Alternatively, the prediction model learning unit 12 may calculate the error by Expression (1).

(Ex. 1)

$$\text{error} = \sum_{i=1}^{D} \sum_{t=0}^{T} \left( \frac{x_{i,t} - x'_{i,t}}{w_i} \right)^2, \quad (1)$$

$$w_i = \frac{1}{T} \sum_{t=0}^{T} x_{i,t}$$

In Expression (1), D is a total number of products i used for calculation of the predicted order quantity, and T is a total number (entire period) of periods (hereinafter referred to as "unit period") t per unit. The unit period t may be 1 hour, 1 day, 1 week, or the like, for example. $x_{i,t}$ denotes the actual order quantity of the product i in the period t, and $x'_{i,t}$ denotes the predicted order quantity of the product i in the period t. In Expression (1), a difference between the actual order quantity $x_{i,t}$ and the predicted order quantity $x'_{i,t}$ in each product is divided by $w_i$. As a result, a magnitude of the error due to the magnitude of the order quantity is normalized (leveled).

In Step S305, the prediction model learning unit 12 feeds back the error calculated in Step S304 to the feature quantity generation unit 110, the feature quantity combination unit 111, and the prediction unit 112. Then, the flow proceeds to Step S306.

In Step S306, if a variation in the error has converged, or if the variation in the error has reached a predefined number of repetitive processes (YES in S306), the prediction model learning unit 12 proceeds to Step S307. On the other hand, the prediction model learning unit 12 returns to Step S302 if the variation in the error has not converged and has not reached the predefined number of repetitive processes (NO in S306).

In Step S307, the prediction model learning unit 12 stores the parameters of the prediction model unit 11 learned by the process described above.

FIG. 4 shows an example of the learning database 10A used in the prediction model learning unit 12. The learning database 10A includes multiple learning records 101A and multiple error calculation records 102A as shown in FIG. 4.

The learning record 101A extracts the first information in the past period P before a certain reference time from the database 10, and combines the first information together. The learning record 101A includes, for example, the time-series information and type information used for prediction.

The type information may be referred to as categorical information. The type information is, for example, information that cannot be expressed by a magnitude of a numerical value such as product category names, product names, or the weather, and/or cannot define an order relationship.

The error calculation record 102A is obtained by extracting the second information in the future period T after a certain reference time from the database and combining the second information together. The error record 102A shown in FIG. 4 is an example of the actual order information on the product A.

FIG. 5 is a flowchart showing a processing example of the order prediction unit 13.

In Step S501, the order prediction unit 13 reads out the information used for calculating the predicted order quantity from the database 10. Then, the flow proceeds to Step S502.

In Step S502, the order prediction unit 13 inputs the information read out in Step S501 to the prediction model unit 11. The prediction model unit 11 outputs the predicted order quantity in the unit period t based on the input information. The order prediction unit 13 acquires the output predicted order quantity in the unit period t. Then, the flow proceeds to Step S503.

In Step S503, the order prediction unit 13 adds one unit to the unit period t. In other words, the order prediction unit 13 advances the unit period t by one unit. Then, the flow proceeds to Step S504.

In Step S504, the order prediction unit 13 determines whether or not the unit period t exceeds a maximum prediction period T (t>T). If the unit period t≤the maximum prediction period T (NO in S504), the flow proceeds to Step S505.

If the unit period t>the maximum prediction period T (YES in S504), the flow proceeds to Step S507.

In Step S505, the order prediction unit 13 stores the predicted order quantity calculated in Step S502 in a memory. Then, the flow proceeds to Step S506.

In Step S506, the order prediction unit 13 adds the predicted order quantity stored in the memory to a new input information. Then, the flow returns to Step S502. As described above, with the addition of the predicted order quantity to the input information again, predictions on the period until any future can be performed.

In Step S507, the order prediction unit 13 stores the predicted order quantity calculated for the maximum prediction period T in a file.

FIG. 6 shows an example of a predicted order quantity in the case where the unit period t is one day.

As shown in FIG. 6, the predicted order quantity on daily units from a predicted start date until a predicted period T is calculated for each product. The predicted order quantity may be a sales number or sales amount of the products and the like. Incidentally, the predicted order quantity may be associated with additional information to the predicted order quantity, such as a reliability c of the predicted order quantity.

Figure 7:
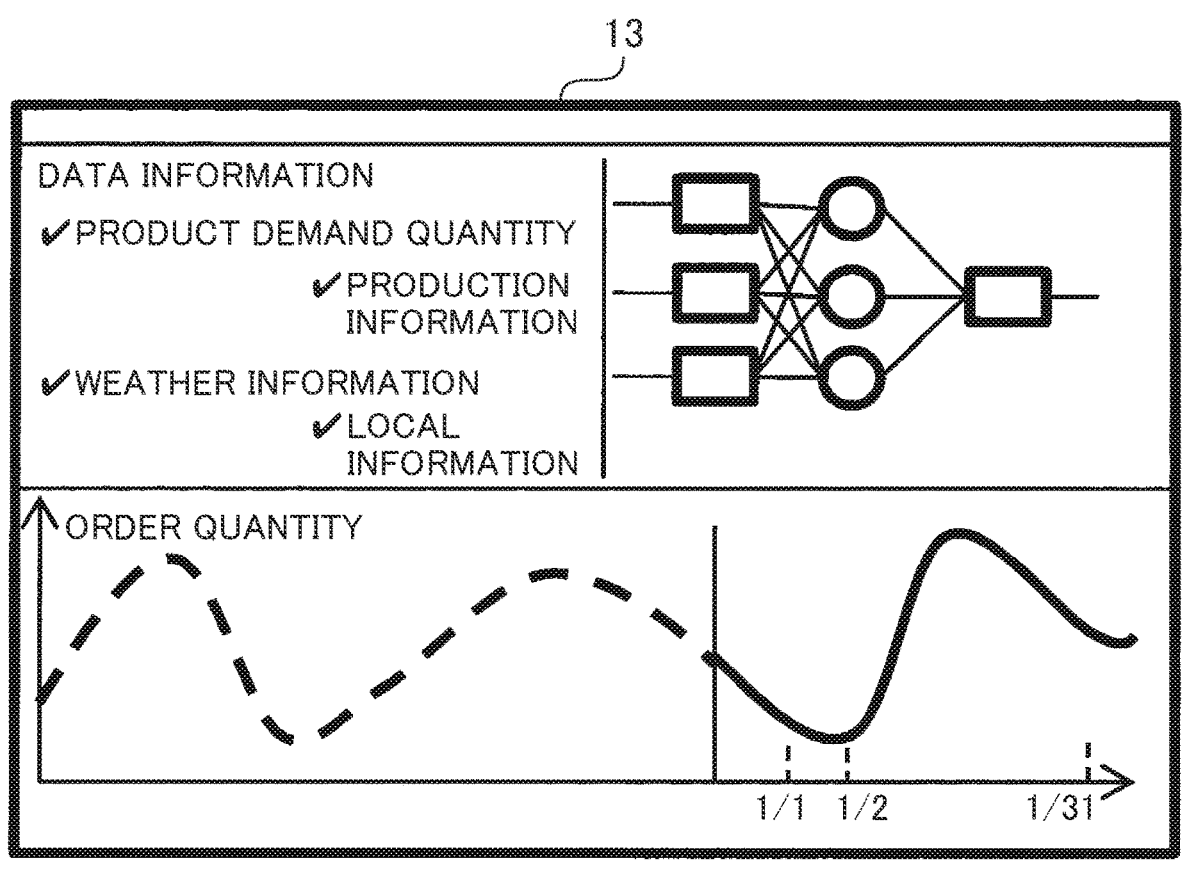
FIG. 7 is a diagram showing an example of an order quantity prediction screen.

FIG. 7 shows an example of an order quantity prediction screen. The order quantity prediction screen is generated by the order prediction unit 13.

As shown in FIG. 7, information used for prediction, a structure of the neural network used for the prediction by the prediction model unit 11, and the calculated predicted order quantity are displayed on an order quantity prediction screen.

In FIG. 7, a graph indicated by a dotted line shows the actual order quantity, and a graph indicated by a solid line shows a predicted order quantity. In other words, the actual order quantity and the predicted order quantity may be displayed collectively on the order quantity prediction screen.

Figure 8:
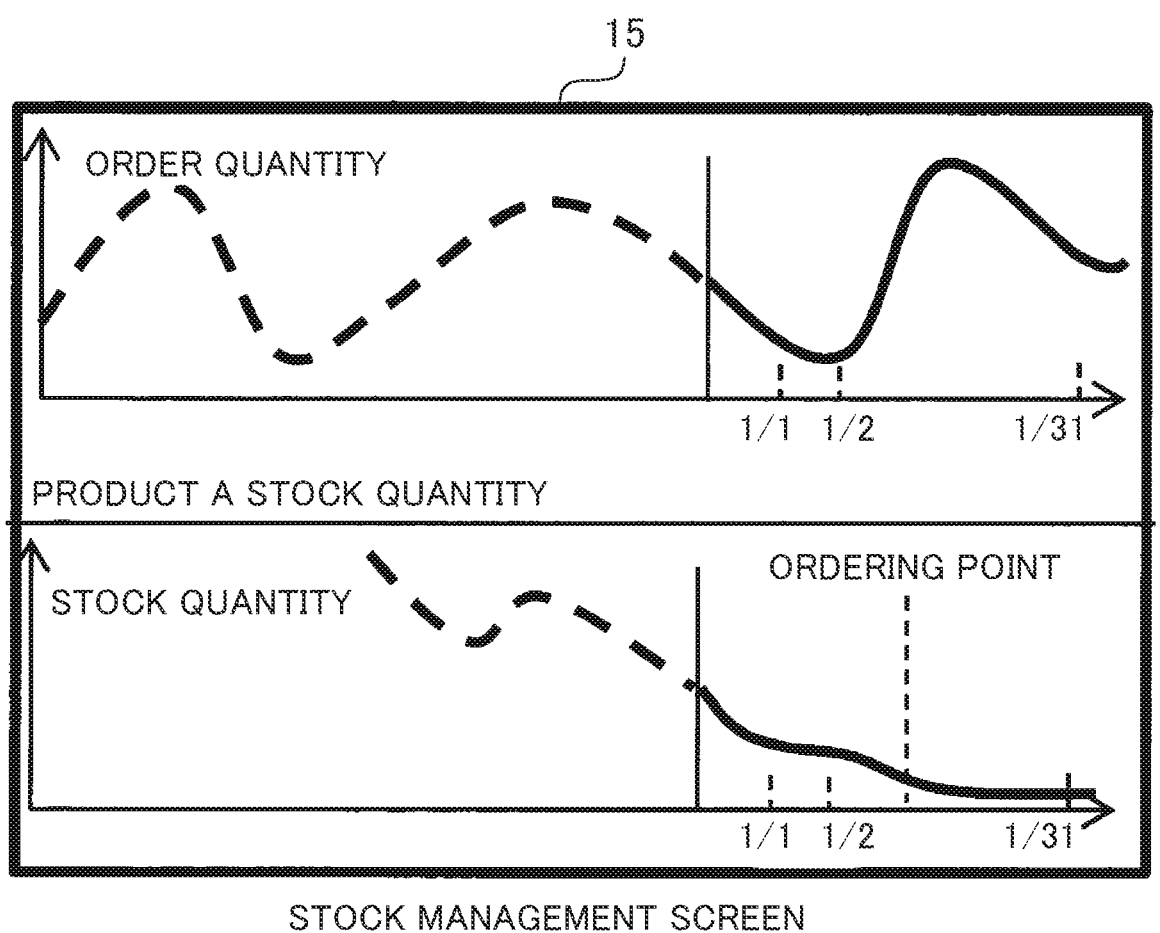
FIG. 8 is a diagram showing an example of a stock management screen.

FIG. 8 shows an example of a stock management screen. The stock management screen is generated by the stock management unit 15.

As shown in FIG. 8, the future predicted stock quantity, which is calculated based on the current stock quantity and the predicted order quantity of the product, is displayed on the stock management screen. As a result, a user can estimate a timing at which the product should be ordered from the future expected stock quantity.

Figure 9:
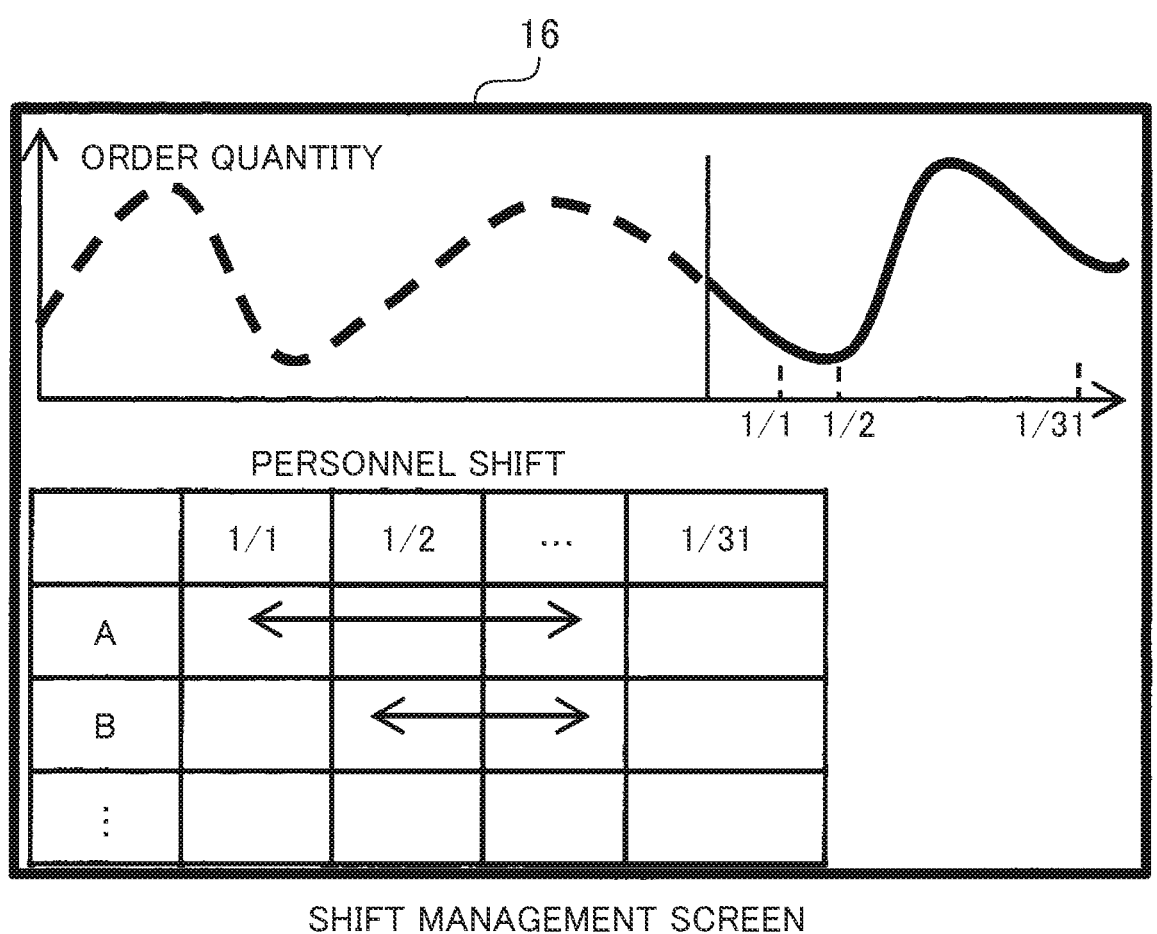
FIG. 9 is a diagram showing an example of a personnel shift management screen.

FIG. 9 shows an example of a personnel shift management screen. The personnel shift management screen is generated by the personnel shift management unit 16.

As shown in FIG. 9, a total number of persons predicted to be required for each day in the future, which is calculated based on the past actual work and the predicted order quantity, is displayed on the personnel shift management screen when, for example, the unit period is set to one day. Further, a recommended shift table indicating how workday should be allocated to each person is displayed on the personnel shift management screen, as shown in FIG. 9, so as to satisfy the total number of personnel required for each day. It should be noted that, if it is assumed that the current total number of persons is short of the predicted order quantity, an alert indicating a personnel shortage is displayed on the personnel shift management screen.

Figure 10:
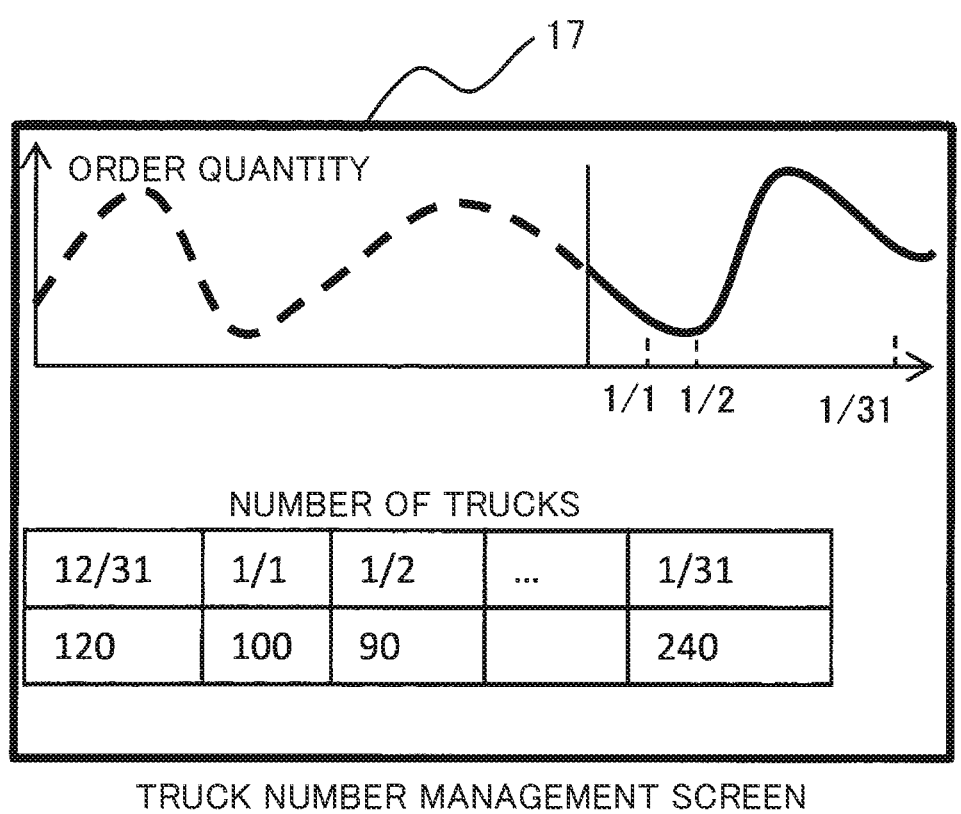
FIG. 10 is a diagram showing an example of a truck number management screen.

FIG. 10 shows an example of the truck number management screen. The truck number management screen is generated by the truck number management section 17.

If the unit period is set as, for example, one day, the total number of trucks predicted to be required for each day in the future, which is calculated based on the number of trucks in the past and the predicted order quantity, is displayed on the truck number management screen. In addition, a recommended truck deployment plan indicating how many trucks should be deployed each day is displayed on the truck number management screen.

As described above, the present disclosure includes the following configurations.

The warehouse management system 1 according to the embodiment of the present disclosure is an example of the data processing apparatus for processing data on the demand (order) of multiple items (products or types). The data processing apparatus includes a model learning unit (prediction model learning unit 12) for generating a prediction model (prediction model unit 11) for predicting a demand of multiple items, and a demand prediction unit (order prediction unit 13) for predicting the demand of the multiple items with the use of the prediction model (order prediction unit 13). The model learning unit inputs the actual data of the demand for each item to the first neural network (neural network 110A) for each item, extracts the feature quantity of each item, and combines the feature quantity of each item, to thereby generate a second neural network (neural network 112A) which is a prediction model.

As described above, the feature quantity of the demand data for each item is extracted in the first neural network provided for each of the multiple items, and the demand for the multiple items is predicted in the second neural network obtained by combining the extracted feature quantities together. In addition, the first neural network is separated from each other for each of the multiple items, and the extraction of the feature quantity of each item and the demand prediction of the plural items are separated from each other. This makes it possible to excellently capture the features of the demand data for the multiple items and to excellently predict the demands for the multiple items.

The model learning unit may update the first neural network and the second neural network based on the error of the demand prediction data generated by prediction by the demand prediction unit using the second neural network.

As described above, the first and second neural networks are updated based on the error of the prediction result of the demand. This makes it possible to reflect the error in both the feature quantity extraction and the demand prediction, and also makes it possible to satisfactorily reduce the error of the demand prediction of the multiple items.

In addition, the model learning unit may weight and combine the feature quantities extracted by the multiple first neural networks with a third neural network (module 111A), and may further update the third neural network based on the error of the prediction data.

As described above, the feature quantity for each item is weighted and combined in the third neural network, and the third neural network is also updated based on the error of the prediction result. This makes it possible to excellently predict the demand for multiple items.

In addition, the model learning unit may feed the error value obtained by normalizing and adding the error between the predicted order quantity and the actual order quantity for the multiple products back to the first neural network and the second neural network, to thereby update the first neural network and the second neural network.

As described above, the error value obtained by normalizing the error of the predicted order quantity of the multiple items is used for updating the first and second neural networks for predicting the order quantity of each of the multiple items. As a result, even if the order quantities of the multiple items are different from each other such that there are products of the large number to sell and products of the small number to sell, the error in the predicted order quantity of each product can be evenly reflected in the update of the first and second neural networks, and the update can be performed so as to reduce the error in the order quantity for each multiple items.

In addition, the demand prediction unit may display the multiple items in a selectively designatable manner, and may display a graph of a time series capable of distinguishing between the actual data of the order quantity and the prediction data of the designated item.

As described above, a transition to the prediction data from the actual data of the order quantity of the multiple predicted items in the time series can be graphically displayed. As a result, the user can visually easily know the transition from the actual order quantity to the prediction.

In addition, the data processing apparatus may further include a stock management unit that calculates a predicted stock quantity of the item based on the prediction data of the order quantity of the item and displays a graph of the time series of the stock quantity.

As described above, the stock quantity for each item is calculated, and the time series data from the actual data to the prediction data is displayed in the form of a graph. As a result, the user can easily manage the stock of the multiple items.

Further, the data processing apparatus may further include a shift management unit that calculates a predicted number of personnel based on prediction data on the order quantity of the item, and display the allocation shift of the time series of personnel.

In this manner, the required number of predicted personnel is calculated, and the recommended personnel allocation shift is displayed in time series. As a result, the user facilitates the personnel shift management.

Further, the data processing apparatus may further include a truck number management unit for calculating the number of predicted trucks based on the prediction data on the order quantity of the item and displaying the number of trucks allocated in time series.

In this manner, the number of necessary trucks to be predicted is calculated, and the recommended number of allocated trucks is displayed in time series. As a result, the user can easily manage the number of trucks.

The embodiment described above is an example for description of the present disclosure and are not intended to limit the scope of the present disclosure only to the embodiment. A person skilled in the art can implement the present disclosure in various other modes without departure from the spirit of the present disclosure.

LIST OF REFERENCE SIGNS

1 . . . warehouse management system, 10 . . . database, 11 . . . prediction model unit, 12 . . . prediction model learning unit, 13 . . . order prediction unit, 14 . . . data storage unit, 15 . . . stock management unit, 16 . . . personnel shift management unit, 17 . . . truck number management unit, 110 . . . feature quantity generation unit, 111 . . . feature quantity combination unit, 112 . . . prediction unit

The invention claimed is:

1. A data processing apparatus for processing data on demand of a plurality of items, comprising:
 a model learning unit that generates prediction models for predicting demands of a plurality of items; and
 a demand prediction unit that predicts the demands of the plurality of items by using the prediction models,
 wherein the model learning unit inputs actual data of the demand for each of the items to a first neural network of each of the items and the first neural network extracts a feature quantity of each of the items, and combines the feature quantity of each of the items together to generate a second neural network which is the prediction model,
 wherein the second neural network calculates a predicted order quantity of each of the items,
 wherein the model learning unit updates the first neural network and the second neural network based on an error in the prediction data of the demand generated due to the prediction using the second neural network, and
 wherein the model learning unit feeds back an error value obtained by normalizing and adding errors between predicted order quantities and actual order quantities of the plurality of products during a unit period to the first neural network and the second neural network to update the first neural network and the second neural network,
 wherein the data processing apparatus, further comprises a stock management unit that calculates a predicted stock quantity of the items based on the predicted order quantity of each of the items, and displays a graph of a time series of the stock quantity.

2. The data processing apparatus according to claim 1, wherein the model learning unit weights and combines the feature quantities extracted by a plurality of the first neural networks with a third neural network, and further updates the third neural network based on the error in the prediction data.

3. The data processing apparatus according to claim 1, wherein
 the demand prediction unit displays the plurality of items in a selectively designatable manner, and displays a graph of a time series which can distinguish the actual data of the order quantity of the designated item from the prediction data.

4. The data processing apparatus according to claim 1, further comprising a shift management unit that calculates a predicted number of personnel based on the prediction data of the order quantity of the item and displays an allocation shift of personnel in time series.

5. The data processing apparatus according to claim 1, further comprising a truck number management unit that calculates the number of trucks to be predicted based on the prediction data of the order quantity of the item and displays the number of trucks dispatched in time series.

6. A data processing method for processing data on a demand for a plurality of items, the method comprising:
 inputting, by a model learning unit, actual data on the demand for each of the items to a first neural network in each of the items and extracts a feature quantity of each of the items;
 generating, by the model learning unit, a second neural network which is a prediction model for predicting the demands for the plurality of items by combining the feature quantity for each of the items together;
 predicting, by a demand prediction unit, the demands for the plurality of items by using the prediction model;
 updating, by the model learning unit, the first neural network and the second neural network based on an error in the prediction data of the demand generated due to the prediction using the second neural network;
 feeding back, by the model learning unit, an error value obtained by normalizing and adding errors between predicted order quantities and actual order quantities of the plurality of products during a unit period to the first neural network and the second neural network to update the first neural network and the second neural network; and
 calculating, by a stock management unit, a predicted stock quantity of the item based on the prediction data of the order quantity of the item, and displaying a graph of a time series of the stock quantity.

* * * * *